March 19, 1968  E. C. TROY  3,373,974
ROTARY MIXER
Filed Feb. 8, 1967
3 Sheets-Sheet 1
FIG. 1
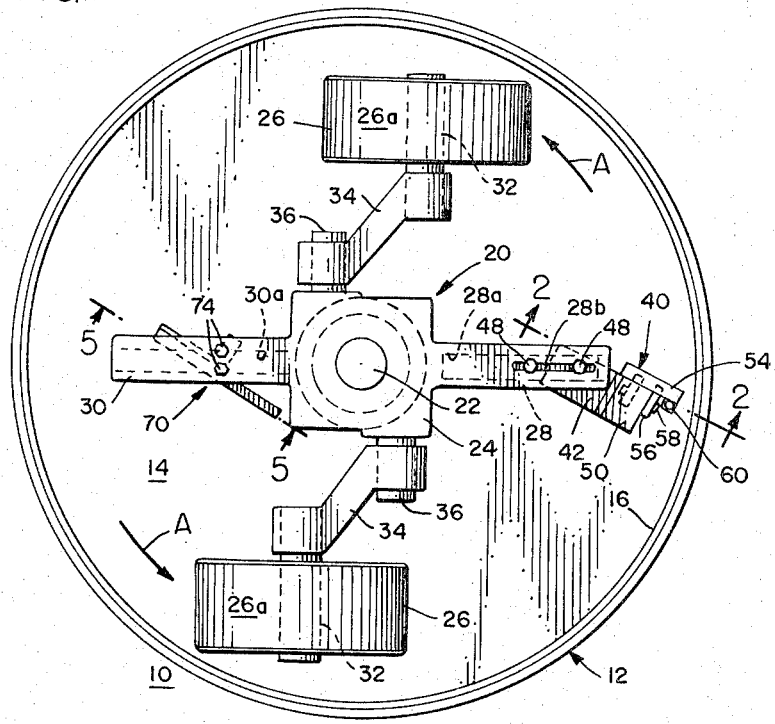
FIG. 3
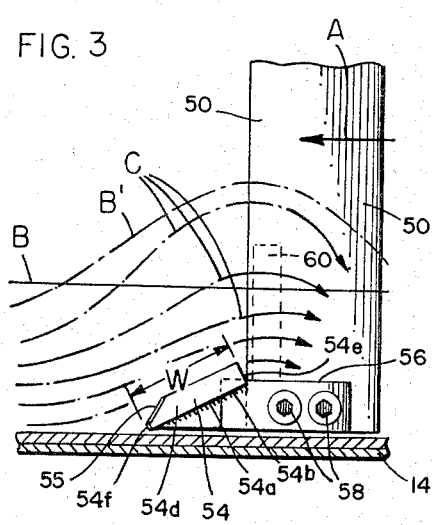
FIG. 4
*INVENTOR:*
ELBERT C. TROY
BY
Masor, Kolehmainen, Rathbury & Wyss
ATT'YS

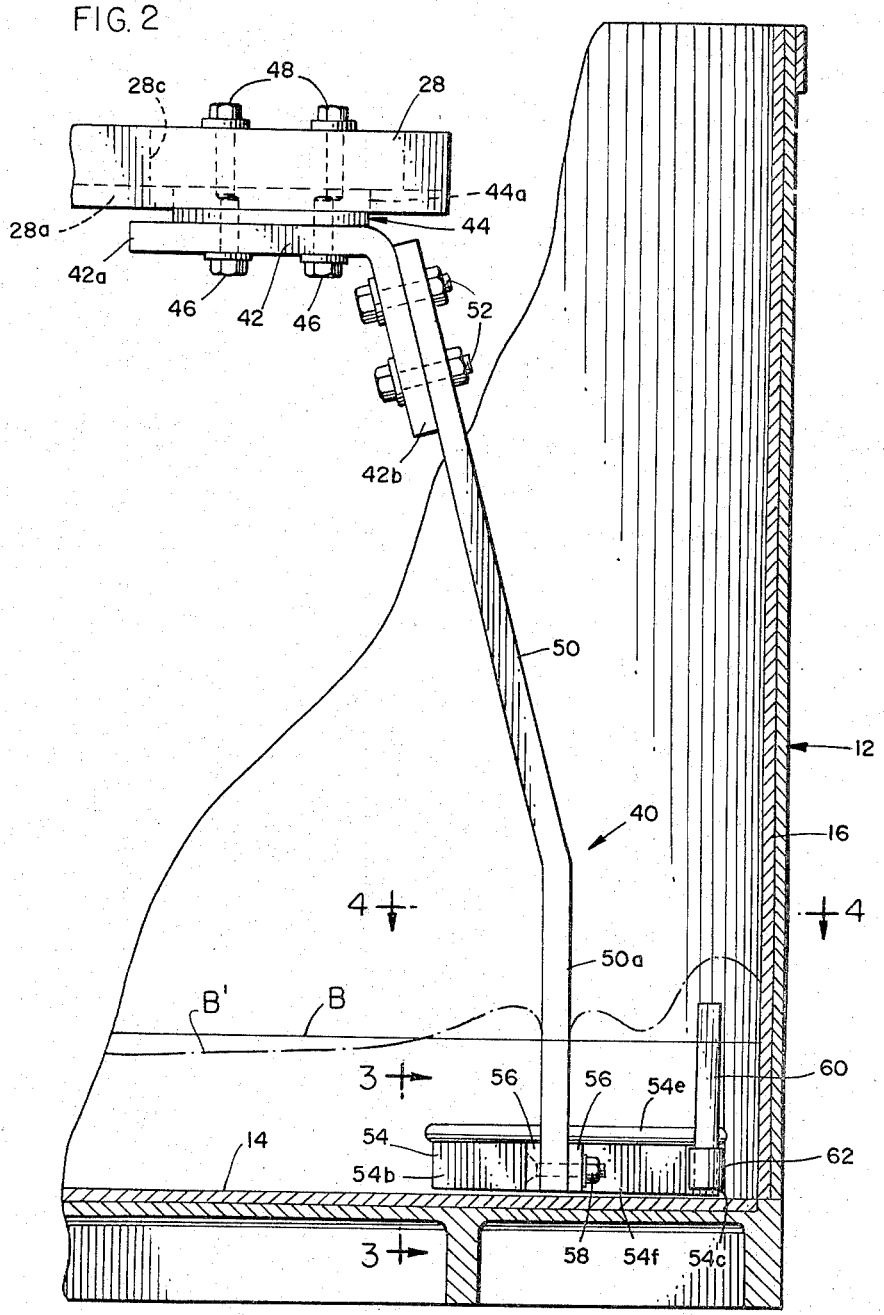

March 19, 1968     E. C. TROY     3,373,974
ROTARY MIXER
Filed Feb. 8, 1967     3 Sheets-Sheet 3
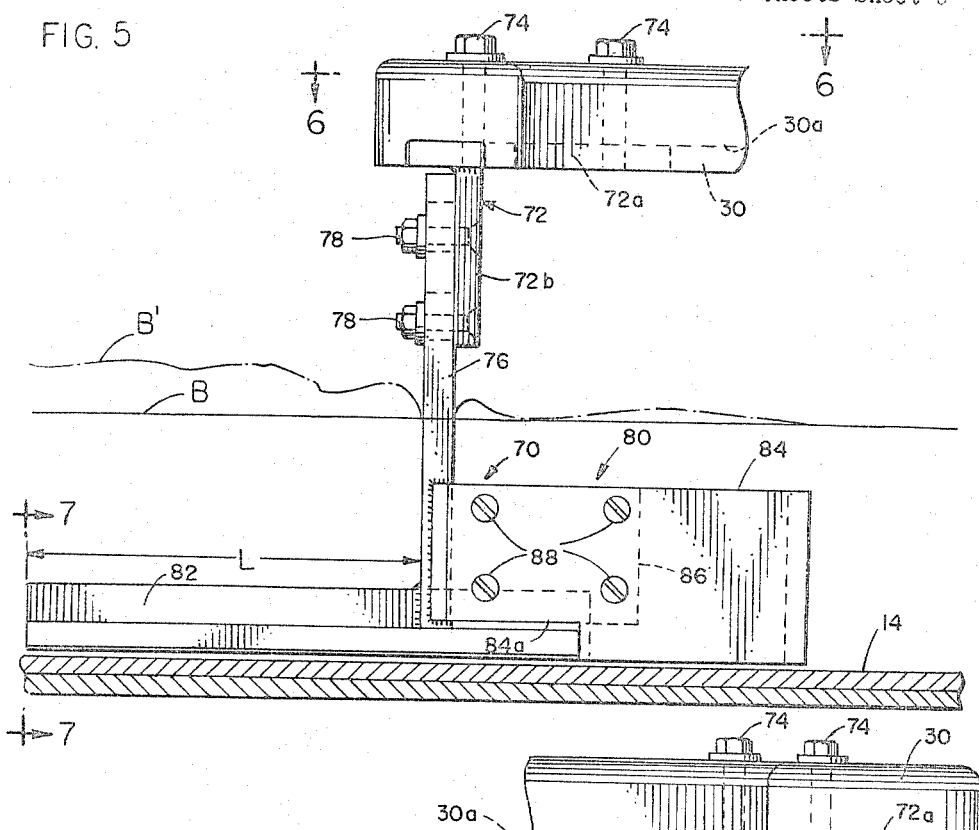
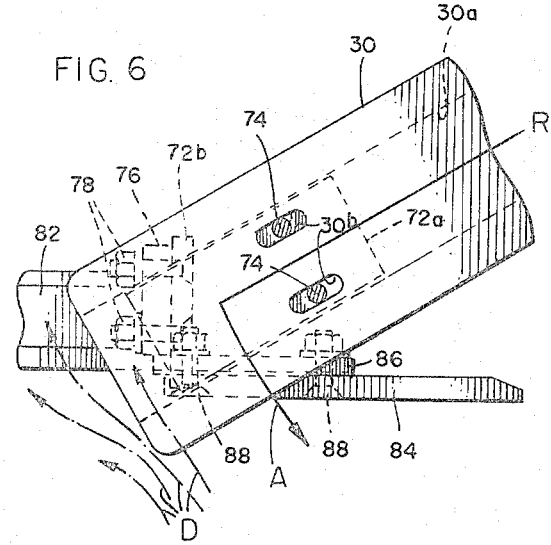
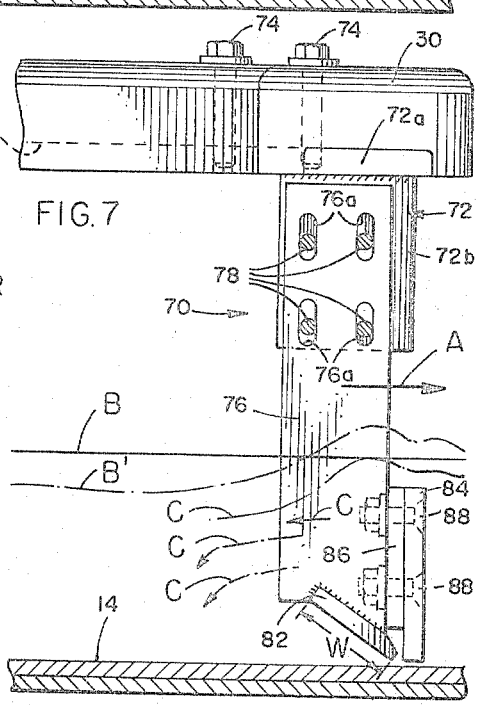
INVENTOR:
ELBERT C. TROY
BY
Magor, Kohlmainer, Rattsbury, Wyss
ATT'YS United States Patent Office 3,373,974
Patented Mar. 19, 1968

3,373,974
ROTARY MIXER
Elbert C. Troy, Highland Park, Ill., assignor to National Engineering Company, Chicago, Ill., a corporation of Delaware
Filed Feb. 8, 1967, Ser. No. 614,669
13 Claims. (Cl. 259—107)

ABSTRACT OF THE DISCLOSURE

A rotary mixer for particulate material, such as foundry sand and the like, including a mixing chamber having a bottom wall and an upstanding peripheral sidewall with a mixing head mounted for rotation in said chamber about an upstanding axis inwardly of the sidewall. The mixing head includes a pair of outwardly extending support arms and a pair of inner and outer plow assemblies mounted on the arms. The outer plow assembly includes a plow having a planar advancing face sloping upwardly of the bottom wall and rearwardly in a direction opposite the movement of the plow into the material. This plow includes an outer and inner end and is positioned with the outer end trailing the inner end in a direction opposite the direction of movement of the plow into the material. The plow is supported from one of the support arms on the mixing head by a downwardly extending leg intermediate the ends of the plow which acts as a divider for dividing the material inwardly and outwardly thereof as it flows over the upper edge of the plow. The mixing head includes an inner plow assembly supported from the other arm of the mixing head which includes an inner plow having inner and outer planar advancing faces. The outer face is sloped upwardly and rearwardly in a direction opposite the movement of the plow into the material and the inner face is generally normal or perpendicular of the bottom wall.

The present invention relates to rotary mixers for conditioning particulate material, such as foundry sand and the like, and more particularly relates to mixers employing a mixing chamber and a rotating head including new and improved plow assemblies for continuously dividing and mixing the material as the mixing head rotates.

The rotary mixer of the present invention is an improvement over the mixer shown and described in the United States Patent No. 3,194,543 and includes new and improved plow assemblies which function to intensely, continuously, and thoroughly mix, divide, and reunite the material during rotation of the mixing head with a minimum of power required and with a minimum of wear and material buildup or accumulation on the mixing chamber surfaces and the plows.

In prior mixers for conditioning foundry sand, one of the problems is the fact that as the sand mass being conditioned reaches a semiplastic condition desired for good molding characteristics, the plows, instead of continuously mixing the sand, merely push a large mass of the semiplastic material around the mixing chamber with very little mixing action achieved. This problem not only greatly increases the power required for rotating the mixing head, but results in greatly increased wear on the plows and surfaces of the mixing chamber and permits the material to build up and accumulate on these components.

In many instances, the amount of material in a normal batch for a given size mixing chamber has been increased substantially over the amount for which the mixer was designed originally, resulting in a higher level of material in the chamber. In these situations, one school of thought has been to correspondingly increase the size of the plows to handle the increased depth of material. This, however, further increased the horsepower requirements and, in many instances, resulted in a decrease rather than an increase in mixing action.

In the present invention, the problem has been greatly reduced or eliminated altogether by providing smaller plows of unique design, rather than merely enlarging the plows to accommodate the increased size of the batches, and the mixing head including the new plows is rotated at higher speeds than before. The angle of attack of the advancing faces of the new plows of the present invention has been adjusted to provide for increased, more efficient mixing action and less power is required. Additionally, a reduction in wear on the plow assemblies and surfaces of the mixing chamber, and a reduction in the amount of material buildup and accumulation is achieved.

In prior arrangements, it was also thought that the faces of the plows should be curved to achieve better mixing and this resulted in higher costs in making the curved structures. However, because of the unique design of the plow assemblies of the present invention, it has been found that plows of smaller size in both height and length and with planar, rather than curved, faces can be used with better results.

It is therefore an object of the invention to provide a new and improved rotary mixer for conditioning particulate material, such as foundry sand and the like.

Another object of the present invention is the provision of a rotary mixer of the character described employing new and improved plow assemblies for mixing the material.

Another object of the present invention is the provision of a new and improved mixing head for rotation in the mixing chamber of a mixer of the character described.

Still another object of the present invention is the provision of new and improved plow assemblies for a rotary mixing head of the character described wherein the plows are relatively small in height and length, thereby reducing the power required and wear thereon, and wherein the plows are positioned with an optimum angle of attack providing for increased mixing efficiency even though the upper level of material in the mixing chamber is well above the plows.

Still another object of the present invention is the provision of new and improved plow assemblies of the type described, including plow support arms positioned to aid in dividing the material flowing over the plows as the mixing head rotates.

A still further object of the present invention is the provision of a new and improved plow of the character described employing an advancing face sloped rearwardly opposite its direction of travel permitting the plow to move under some of the material and causing the material to be lifted, mixed, and tumbled as it passes over the plows, rather than merely being pushed ahead of the plows around the chamber.

Another object of the present invention is the provision of a new and improved mixer plow employing multiple advancing faces having different slopes encountering the material during movement of the plow.

Still another object is to provide a new and improved plow of the character described employing an advancing face of minimal area and extending outwardly and rearwardly in a direction opposite the direction of travel into the material.

For a better understanding of the invention reference should be had to the following detailed description taken in conjunction with the drawings, in which:

FIG. 1 is a top plan view of a rotary mixer for particulate material embodying the present invention;

FIG. 2 is a sectional view taken substantially along the plane 2—2 of FIG. 1 and illustrating in elevation a new and improved outer plow assembly embodying the present invention;

FIG. 3 is a fragmentary sectional view taken substantially along line 3—3 of FIG. 2;

FIG. 4 is a fragmentary sectional view taken substantially along line 4—4 of FIG. 2;

FIG. 5 is a sectional view take nsubstantially along the plane 5—5 of FIG. 1 and illustrating in elevation a new and improved inner plow assembly embodying the present invention;

FIG. 6 is a fragmentary sectional view taken substantially along line 6—6 of FIG. 5; and FIG. 7 is a fragmentary sectional view taken substantially along line 7—7 of FIG. 5.

The foregoing and other objects and advantages of the present invention are accomplished by the provision of a new and improved rotary mixer for particulate material employing a mixing chamber having a bottom wall and an upstanding sidewall and a mixing head mounted for rotation around the chamber about an upstanding axis inwardly of the side wall. The mixing head includes an outer plow assembly adapted to move in a circular orbit adjacent the sidewall of the mixing chamber and an inner plow assembly, which is adapted to move the material outwardly of the central portion of the chamber into the path traversed by the mulling wheels as the mixing head rotates.

Each plow assembly includes a plow structure having a relatively small planar advancing face with an upper edge positioned well below the average upper level of material in the mixing chamber and a lower edge adapted to move in close proximity to the chamber bottom wall. The planar faces of the plows are sloped upwardly and rearwardly in a direction opposite to the direction of the movement of the plows, so that as the plows move into the material, the material is elevated and tumbles over the upper edge and is thoroughly mixed, rather than merely being pushed ahead of the plows as they move around the mixer. The outer plow is carried at the lower end of a support leg having a downwardly extending portion with a thin leading edge which advances into the material and divides it intermediate the ends of the plow as the mixing head is rotated. The advancing face of the outer plow is positioned to extend outwardly of the axis of rotation of the mixing head and the outer end trails the inner end so that the material can more easily move over the upper edge of the plow rather than merely being pushed ahead as the plow traverses its circular orbit.

The inner plow assembly is located adjacent the central position of the mixing chamber and extends outwardly toward the side wall. The outer end of the inner plow trails the inner end so that as the mixing head rotates, the material is moved outwardly of the central portion of the mixing chamber along the advancing face of the plow as well as spilling over the top edge and tumbling behind the plow as it moves. Accordingly, excellent mixing action is achieved and the material is not merely pushed ahead of the plow as it moves around the chamber. The inner plow also includes a vertically upstanding inner portion which helps to initially move the material near the center of the chamber outwardly onto the rearwardly sloping outer portion of the plow face where the material is subjected to the thorough mixing action previously described.

Referring now, more particularly, to the drawings, therein is illustrated a rotary mixer constructed in accordance with the present invention and referred to generally by the reference numeral 10. The mixer 10 includes a mixing chamber 12 having a bottom wall 14 and an upstanding peripheral sidewall 16. A mixing head 20 is mounted for rotation in the mixing chamber 12 on a vertical shaft 22 centrally located in the chamber. The mixing head 20 includes a turrethead 24 mounted on the upper end of the shaft 22 and the turrethead provides support for a pair of large, heavy mulling wheels 26 mounted on opposite faces of the head. The turrethead 24 also includes a pair of integrally formed, diametrically opposed, radially outwardly extending plow support arms 28 and 30 extending normal to the axes of rotation of the mulling wheels 26 and spaced above the chamber bottom wall. Support arm 28 provides support for an outer plow assembly 40 and the opposite support arm 30 supports an inner plow assembly 70.

Each mulling wheel 26 is supported for free rotation on a horizontal, outwardly extending axle 32 and the wheels include outer peripheral mulling surfaces 26a adapted to engage the material in the mixing chamber and crush it against the bottom wall 14 as the mixing head rotates. The wheel support axles 32 are supported on the outer ends of brackets 34 which in turn are mounted for pivotal movement on pins 36 which protrude from opposite side faces of the turrethead structure 24.

Accordingly, as the mulling head 20 is rotated around the mixing chamber 12 in a counterclockwise (advancing) direction, as indicated by the arrows A in FIG. 1, the mulling wheels 26 are free to rotate on their support axles 32 and move up and down with floating action as the wheels ride on the bed of material in the chamber. The wheels 26 traverse an annular path around the mixing chamber (FIG. 1) inwardly of the sidewall 16 and outwardly of the turrethead 24, and the mulling surfaces 26a of the wheels continuously engage the material in the chamber, forcing the material against the bottom wall 14 and continuously mulling the material to crush and break up any lumps of agglomerates therein.

In addition to the mulling action of the wheels 26 on the material, the material is continuously divided, mixed, and reunited, in accordance with the invention, by the action of the plow assemblies 40 and 70 as the mixing head rotates. The outer plow assembly 40 is supported at the outer end of the turrethead arm 28 and to this end includes an L-shaped support bracket 42 having a horizontal leg 42a bolted to the underside of a support block 44 by a plurality of bolts 46. The block 44 is formed with a longitudinal key 44a on the upper face thereof which is mounted to slide in a slot or keyway 28a machined in the undersurface of the arm 28. The position of the support block 44 on the arm 28 is adjustable so that the plow assembly 40 may be moved inwardly and outwardly with respect to the center of the mixing chamber, and to this end the arm 28 is provided with a vertical, longitudinal slot 28b to accommodate a pair of bolts 48 which extend downwardly into threaded bores formed in the key portion 44a of the support block.

The L-shaped support 42 also includes a downwardly extending leg 42b which is bolted to the upper end of a downwardly extending plow support leg 50 by a plurality of bolts 52. The support leg 50 is preferably constructed of bar stock, or the like, and includes a vertically extending lower end portion 50a with its lower end terminating slightly above the upper surface of the mixing chamber bottom wall 14. An outer plow 54 is mounted on the lower end portion 50a of the support leg 50 and is adapted to move in a circular orbit around the mixing chamber 12 in close proximity to the interior surface of the peripheral sidewall 16.

The outer plow 54 may be constructed of a short length of steel bar stock and includes an advancing face 54a which is sloped relative to the bottom wall 14 of the mixing chamber at an angle of approximately 30 degrees, as best shown in FIG. 3. The plow 54 also includes a back face 54b, and outer end 54c, an inner end 54d, an upper edge surface 54e, and a lower edge 54f. The plow 54 is supported from the lower end portion 50a of the support leg 50 by means of a pair of spaced apart, horizontally rearwardly extending brackets 56 which are disposed to lie on opposite sides of the support leg portion 50a and are provided with drilled apertures to receive bolts 58 which extend through the brackets and aligned openings in the supporting leg portion. The forward ends of the brackets 56 are cut at an angle to engage the back face 54b of the plow member 54 and are welded thereto, as best shown in FIG. 3. Accordingly, the plow member 54 can be readily disassembled from the supporting leg portion 50a and replaced or refinished, if desired, by loosening the bolts 58.

In contrast to prior mixers, the advancing face 54a of the plow is relatively small in area and is planar rather than curved, greatly simplifying the construction and reducing the cost of manufacturing. As shown in FIG. 3, the lower edge 54f is tapered or sharpened and a plurality of carbide chips 55 may be soldered or brazed onto the plow along the lower edge portion to resist wear encountered as the plow moves into the material in the chamber. The plow is positioned with its lower edge slightly above the upper surface of the mixing chamber bottom wall 14 and, as the mixing head rotates, sand or other particulate material in the chamber is elevated and lifted because of the slope of the advancing face 54a. The lifted material tumbles and rolls over the top edge 54e of the moving plow and falls downwardly behind the plow as it advances. The direction of movement of the plow member around the mixing chamber is illustrated by the arrows A in FIGS. 2, 3, and 4, and as best shown in FIG. 3, the advancing face 54a slopes upwardly and rearwardly of the mixing chamber bottom wall in a direction opposite to the direction of advancement of the plow into the material. Solid line B in FIGS. 2 and 3 indicates the upper level of a normal sized batch of material contained in the mixing chamber when the mixing head is not being rotated, and it should be noted that the upper edge 54e of the plow is positioned well below the line B. This is in contrast to prior thinking and designs wherein, as the batch sizes used in a mixing chamber of given size were increased, the vertical dimensions of the plow were also increased correspondingly. Oftentimes, when plows were increased in size because of increases in the amount of material in a batch, the material directly ahead of the plow was merely pushed around the chamber in a large mass as the mixing head rotated with little or no mixing action. When this occurred, a large increase in horsepower was required to rotate the mixing head, and wear of the bottom wall of the chamber and the plow increased substantially.

In practicing the present invention, it has been found that a slope or angle of attack between the advancing plow face 54a and the bottom wall of the mixing chamber in the order of approximately 30 degrees works well, and when the mixing head is rotated the material is thoroughly mixed even if the plow is relatively small and the upper level of material is well above the plow. In contrast to previous mixers, the length L of the plow 54 is relatively short and, while the outer end 54c of the plow is positioned to move in a path close to or adjacent the peripheral sidewall 16, the inner end 54d does not extend inwardly of the peripheral sidewall of the mixing nearly to the extent of previous plow constructions. Because the material is elevated upwardly and over the top edge 54e of the plow, as it moves around the mixing chamber, rather than merely being pushed ahead of the plow, increased mixing action is achieved and, in addition, wear on the plow and mixing chamber bottom wall is substantially decreased.

Dotted line C of FIG. 3 indicates generally the path traveled by the material as the plow 54 advances in a direction of the arrow A, and it should be noted that the material is elevated upwardly at a fairly rapid rate and then falls back downwardly into the bed of material behind the plow. This rolling and tumbling action greatly increases the mixing efficiency, even in materials that are in a semiplastic condition, such as foundry sand, in readiness for use in molding operations.

Referring now specifically to FIGS. 1 and 4, it can be seen that as the mixing head rotates around the chamber, the plow 54 moves in a direction indicated by the arrow A (generally tangent to the circular orbit or perpendicular to the outer end of a radial indicated as R extending interiorly of the vertical axis of rotation of the mixing head). The advancing face 54a of the plow is angularly disposed with respect to the radial R so that the outer end 54c is behind the inner end 54d in respect to the direction of advancement of the plow into the material. In prior mulling machines, it was thought that the outer end of the outer plow should be positioned ahead or in advance of the inner end, in order to direct the material inwardly towards the center of the mixing chamber. It has been found, however, that with the plow 54 of the present invention that is not necessary and, in fact, it is desirable to position the plow as shown so that the advancing face thereof intersects the radial R at an angle of approximately 15 degrees, with the outer end 54c of the plow trailing rather than in advance of the inner end 54d. Because of the described angular displacement of the advancing face 54a of the plow in relation to its direction of movement, it has been found that the tendency of the plow to push the material around as a large mass has been markedly decreased and, instead, the material tends to be broken up and flow outwardly toward the sidewall and upwardly over the top edge of the plow. Again referring to FIG. 4, it should be noted that the support leg 50 is disposed to lie in a plane perpendicular with the leading lower and upper edges of the plow 54. Preferably, the support leg 50 is constructed of relatively thin bar stock and is arranged with its thin edge facing forwardly to advance directly into the material as the mixing head rotates. Accordingly, the support leg 50 itself acts as a knife and divides the material flowing over the upper edge 54e of the plow laterally intermediate the ends of the plow as indicated by the arrows D (FIG. 4). Thus a portion of the material is retained inwardly of the leg 50 while the remaining portion is free to flow outwardly toward the sidewall 16, and the latter portion is small enough in volume that it does not tend to collect and build up on the sidewall.

Another feature of the present invention comprises a vertically extending pole or rod 60 positioned adjacent the outer end of the plow member 54. The rod 60 is seated in a cup-like receptacle 62 welded to the back face 54b of the plow member and may be easily replaced from time to time. As the mixing head rotates around the chamber, material closely adjacent the peripheral sidewall 16 is squeezed between the pole 60 and the sidewall and after passage of the pole, the material rebounds inwardly off of the sidewall toward the center of the mixing chamber in the direction indicated by the arrows E (FIG. 4). This pole 60 aids in preventing the material from building up on the sidewall 16 and further increases the mixing action behind the advancing plow assembly.

In conditioning particulate material, such as foundry sand and the like, the material changes considerably in texture and consistency from the time it is first introduced into the mixer until it is finally ready for use in molding operations. The material, when first introduced, comprises relatively free flowing granules or particles, and the mixing proceeds as binding materials and water are added to bond the granules together into a sort of semiplastic condition, which is required for use as molding sand. Material in the semiplastic condition described is difficult to mix thoroughly because the particles tend to stick together; however, the plows of the present invention have proved successful in mixing materials of such diverse consistencies as described because of the unique design. Another factor of importance is the speed of rotation of the mixing head, and this speed varies according to the diameter of the specific mixing chamber involved. In the past, for small mixing chambers in the order of three to four feet in diameter, speeds of 20 r.p.m. have been used, while in larger mixers the speeds have been increased up to as much as 45 r.p.m. The peripheral tip speed of the outside plow is a controlling factor, and in the present invention it has been found that greatly increased tip speed of 700 f.p.m. are possible without requiring excessive horsepower because of the reduced size of the plows in comparison with prior machines. In this connection it has been found that dimensions of the plow face 54a are of importance; for example, when the length of the plow face (distance L, FIG. 4) is approximately one-fourth the radius of the mixing chamber from the center of the axis of rotation to the sidewall, extremely efficient mixing is achieved at higher speeds with less horsepower being required. Another factor of importance is the slant distance along the face of the plow (W in FIG. 3) between the lower edge 54f and the upper edge 54e) in relation to the length L, and a ratio of about three to one between L and W has been found to achieve good mixing action.

Referring now to the inner plow assembly 70 and specifically to FIGS. 1, 5, 6, and 7, this plow assembly includes an upper L-shaped bracket 72 having a horizontal leg 72a and a downwardly extending leg 72b. The horizontal leg 72a is seated within a longitudinal keyway or recess 30a formed on the underside of the mixing head support arm 30. The support arm 30 is formed with a pair of spaced apart, vertically extending slots 71 therein in order to accommodate a pair of cap screws 74 which protrude downwardly through the slots into bores formed in the horizontal leg 72a of the L-shaped bracket. The bracket 72 can be moved inwardly and outwardly, as desired, on the arm 30 to properly position the plow assembly 70 with respect to the central shaft 22 of the mixer. The downwardly extending leg 72b of the bracket is secured to a downwardly extending support leg 76, and to provide for vertical adjustment of the leg 76 with respect to the bracket, the leg is provided with a plurality of vertically extending, spaced apart slots 76a (FIG. 7), in order to accommodate a plurality of bolts 78 holding the members together.

The lower end of the support leg 76 supports an inner plow member 80 (FIGS. 5, 6, and 7) comprising an outer section 82 and an inner section 84 adjacent the central portion of the mixing chamber 12. The outer plow section 82 is similar to the outer plow member 54 previously described and is fixedly secured to the lower end of the support leg 76 by welding or other means, as best shown in FIGS. 5 and 7. The lower edge of the outer plow section 82 is adapted to move in close proximity to the upper surface of the mixing chamber bottom wall 14, and the outer section includes a planar advancing face sloping upwardly and rearwardly in a direction opposite the direction of movement of the plow around the mixing chamber, as indicated by the arrow A in FIG. 6. Mixing action of the outer plow section 82 is similar to the outer plow member 54 previously described, and the outer section is positioned with its outer end trailing with respect to its inner end so that material in the central portion of the mixing chamber will be moved outwardly into the path of the mulling wheel as the plow assembly 70 rotates.

The inner section 84 of the inner plow 80 includes a removable inner plow member with a vertically extending, advancing face having a notch 84a formed in the lower outer corner thereof in order to accommodate a portion of the outer section 82 which extends inwardly of the support leg 76, as best shown in FIG. 5. The inner plow section 84 is secured to a vertical backing plate 86 which is welded to the leading edge of the support leg 76, and a plurality of bolts 88 with countersunk heads are provided to secure the removable plow member to the backing member. Because the speed of movement of the inner plow section 84 into the material is lower than the speed of the outer plow 54 and the outer end of the outer plow section 82, the plow section is designed to positively move the material near the center of the chamber outwardly towards the peripheral sidewalls of the mixing chamber into the path of the mulling wheels, and, accordingly, the advancing face of the inner section does not slope but extends vertically with respect to the bottom wall 14 in contrast to the outer section 82 and the outer plow member 54 which are moving at greater speeds into the material. The inner plow assembly 70 performs two functions, one function being accomplished by the vertically extending inner plow section 84 which positively moves the material outwardly of the central portion of the mixing chamber where it is then picked up by the faster moving outer section 82, which functions to mix the material efficiently in much the same manner as the outer plow member 54. The inner plow section 84 acts as a paddle or scoop to force the material outwardly into the region traversed by the outer plow section 82 where efficient mixing action takes place as described. The vertically extending inner plow section 84 thus prevents the material from building up or collecting near the center of the mixer while the outer plow section 82 thoroughly mixes this material and directs it outwardly into the path of the mulling wheels. The supporting leg 76 also acts as a dividing member and divides the flow over the plow sections 82 and 84 into two portions, one of which is moved outwardly along the advancing faces of the plow sections, as indicated by the arrows B in FIG. 6. The advancing faces of the inner and outer plow sections of the inner plow assembly 70 are angularly disposed with respect to the support arm 38 of the mixing head at an angle of approximately 15 degrees (FIG. 6), similar to the angular displacement between the outer plow member 54 and its supporting arm 28. The outer plow section 82, extending outwardly of the support leg 76, is approximately equal in size to the outer plow member 54, and the length L thereof is approximately three times the slant height W, as best shown in FIGS. 5 and 7. It has been found in operating the plow assembly 70 of the present invention, that efficient action is achieved even though this plow assembly moves into the material at a much lower speed than the outer plow member 54. In addition, material buildup or accumulation near the central portion of the mixing chamber 12 is eliminated by the action of the inner plow section 84.

The inner plow assembly 70 preferably is constructed of bar stock and advancing faces are planar rather than curved, thus simplifying fabrication and reducing the cost while achieving surprisingly improved performance over that of prior types of plow structures of much greater size and curved advancing faces.

From the foregoing it can be seen that the mixer 10 of the present invention, including the new and improved mixing head plow assemblies is extremely efficient in mixing even the most difficult material, such as foundry sand and the like. Wear on the plow assemblies and mixing chamber surfaces is reduced, and the power required to mix the material is significantly reduced, even though substantially improved mixing action is achieved.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. In a mixer for particulate material, such as foundry sand and the like, including a mixing chamber having a bottom wall and an upstanding peripheral sidewall, and a mixing head mounted for rotation in said chamber about an axis extending upwardly of said bottom wall and spaced inwardly of said sidewall, said mixing head including at least one support arm spaced above said bottom wall and extending outwardly of said axis toward said sidewall, the improvement comprising a plow assembly supported by said arm for movement around a circular orbit in the material in said chamber, said assembly including a plow having a substantially rectangular, planar advancing face, an upper and lower edge and an inner and outer end, a support leg having an upper end connected to said arm and extending downwardly therefrom and including a lower portion connected to said plow, said advancing face of said plow sloping upwardly of said bottom wall at an angle of approximately 30 degrees and rearwardly in a direction opposite the movement of said plow into said material, said inner end of said plow positioned ahead of said outer end thereof in the direction of movement of said plow into said material, said outer end being positioned to move in close proximity to said peripheral sidewall as it travels in said circular orbit, said upper and lower edges of said plow face being approximately one-fourth as long as the distance from the axis of rotation of said mixing head to said upstanding sidewall, and the distance between said upper and lower edges of said plow face being approximately one-third of the distance between the inner and outer ends of said plow face.

2. The apparatus of claim 1 including post means extending upwardly above the upper edge of said plow face and positioned adjacent the outer end thereof.

3. In a mixer for particulate material, such as foundry sand and the like, including a mixing chamber having a bottom wall and an upstanding peripheral sidewall, and a mixing head mounted for rotation in said chamber about an axis extending upwardly from said bottom wall and spaced inwardly of said sidewall, said head including a support arm extending outwardly of said axis toward said sidewall, the improvement comprising a plow assembly supported by said arm for movement around a circular orbit in the material contained in a central portion of said chamber, said assembly including a plow having an inner section and an outer section, a support leg extending downwardly of said arm for supporting said plow at its lower end, said inner section of said plow including a vertical planar advancing face extending inwardly of said leg toward said axis of rotation, said outer section having a sloped planar advancing face and extending outwardly of said leg toward said sidewall, said sloped advancing face extending upwardly of said bottom wall and rearwardly in a direction opposite the movement of said plow into said material.

4. The apparatus of claim 3 wherein said inner and outer sections include upper edges, the upper edge of said inner section being spaced at a level above the upper edge of said outer section.

5. The apparatus of claim 4 wherein the upper edges of said inner section and outer section are parallel and are angularly disposed in relation to said support arm with the outer end of said outer section trailing said inner section in a direction generally opposite the direction of movement of said plow into said material.

6. The apparatus of claim 3 wherein said sloped advancing face of said outer section is sloped at an angle of approximately 30 degrees with said bottom wall.

7. The apparatus of claim 3 wherein a portion of said outer section extends inwardly of said leg.

8. The apparatus of claim 3 wherein the advancing face of said outer section is smaller in dimension between the upper and lower edges thereof than said inner section.

9. In a mixer for particulate material, such as foundry sand and the like, including a mixing chamber having a bottom wall and an upstanding peripheral sidewall, and a mixing head mounted for rotation in said chamber about an axis extending upwardly of said bottom wall and spaced inwardly of said sidewall, said mixing head including a pair of diametrically opposed support arms extending outwardly of said axis toward said sidewall and spaced above said bottom wall, the improvement comprising an outer plow assembly supported by one of said arms for movement around a circular orbit in the material adjacent said sidewall, said outer plow assembly including an outer plow having a planar advancing face, an upper and lower edge, and an inner and outer end, said advancing face of said outer plow sloping upwardly of said bottom wall and rearwardly in a direction opposite the movement of said plow into the material, said inner end of said outer plow positioned in advance of the outer end in the direction of movement of said plow into the material, and an inner plow assembly supported by the other of said arms for movement about a circular orbit in the material adjacent the center of said chamber, said inner plow assembly including an inner plow having an inner section and an outer section, an inner support leg extending downwardly from said other support arm and connected to said inner plow at its lower end, said inner section having a vertical advancing face and extending inwardly of said inner support leg toward said axis of rotation, said outer section having a sloped advancing face and extending outwardly of said inner section, said sloped advancing face of said outer section extending upwardly of said bottom wall and in a direction opposite the movement of said inner plow in said material.

10. The apparatus of claim 9 wherein the inner end of said outer plow moves in a circular orbit spaced outwardly of the orbit of travel of said inner plow.

11. The apparatus of claim 9 wherein the lower edge of said outer plow and the advancing face of said inner section of said inner plow lie in vertical parallel planes.

12. The apparatus of claim 11 wherein said vertical parallel planes angularly intersect a common vertical plane extending through said support arms at an angle of approximately 15 degrees.

13. The apparatus of claim 12 wherein the advancing faces of the inner section of said inner plow and of said outer plow are sloped at approximately 30 degrees to said chamber bottom wall.

References Cited

UNITED STATES PATENTS

| 2,570,223 | 10/1951 | Everett et al. | 259—108 |
| 3,160,400 | 12/1964 | Harrison | 259—108 |
| 3,194,543 | 7/1965 | McIlvaine | 259—107 |

ROBERT W. JENKINS, *Primary Examiner.*